United States Patent
Cho et al.

(10) Patent No.: US 7,626,742 B2
(45) Date of Patent: Dec. 1, 2009

(54) COLOR DATA CONVERSION APPARATUS AND METHOD USING GAMUT BOUNDARY DESCRIPTORS

(75) Inventors: Min-ki Cho, Seoul (KR); Dae-won Kim, Daegu (KR); Heui-keun Cho, Seongnam-si (KR); Byoung-ho Kang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 225 days.

(21) Appl. No.: 11/354,927

(22) Filed: Feb. 16, 2006

(65) Prior Publication Data

US 2006/0182336 A1 Aug. 17, 2006

(30) Foreign Application Priority Data

Feb. 16, 2005 (KR) .............. 10-2005-0012712
Jan. 17, 2006 (KR) .............. 10-2006-0005007

(51) Int. Cl.
G03F 3/08 (2006.01)
H04N 1/46 (2006.01)
G06K 9/00 (2006.01)

(52) U.S. Cl. .............. 358/529; 358/515; 358/518; 358/520; 358/523; 382/162

(58) Field of Classification Search .............. 358/3.14, 358/529, 515, 518, 523, 520, 1.9, 3.23, 504; 345/590, 76, 589, 600, 603, 604; 382/269, 382/162, 167, 284, 270, 145, 164; 396/213, 396/56; 353/82; 428/323, 631; 375/240.21; 348/50, 223.1, 493; 429/10; 430/108.8; 349/146

See application file for complete search history.

(56) References Cited

U.S. PATENT DOCUMENTS

| | | | | |
|---|---|---|---|---|
| 2,729,697 A | * | 1/1956 | Chatten | 348/493 |
| 4,700,219 A | * | 10/1987 | Tanaka et al. | 348/223.1 |
| 4,811,108 A | * | 3/1989 | Numakura et al. | 358/3.14 |
| 4,828,365 A | * | 5/1989 | Stewart et al. | 349/146 |
| 5,329,385 A | * | 7/1994 | Washio | 358/515 |
| 5,331,440 A | * | 7/1994 | Kita et al. | 358/529 |
| 5,402,253 A | * | 3/1995 | Seki | 358/518 |
| 5,502,579 A | * | 3/1996 | Kita et al. | 358/518 |
| 5,534,379 A | * | 7/1996 | Dalal et al. | 430/108.8 |
| 5,619,427 A | * | 4/1997 | Ohkubo | 358/523 |
| 5,704,026 A | * | 12/1997 | Wan | 345/590 |
| 5,719,956 A | * | 2/1998 | Ogatsu et al. | 358/518 |

(Continued)

Primary Examiner—Twyler L Haskins
Assistant Examiner—Jonathan R Beckley
(74) Attorney, Agent, or Firm—Sughrue Mion, PLLC (57) ABSTRACT

A color data conversion apparatus and method. The color data conversion apparatus includes a K ratio calculator for outputting a K ratio that is calculated using entered color data; a K ratio adjuster for adjusting the calculated K ratio, which is output from the K ratio calculator, in reference to gamut boundary descriptors (GBDs) corresponding to a K ratio and outputting the adjusted K ratio as a final K ratio; and a CMY ratio calculator for calculating C, M, and Y ratios based on the final K ratio. When converting the entered color data to the CMYK data, the calculated K ratio can be adjusted to the K ratio printable by use of the K GBDs. Accordingly, the printing apparatus can substantially print according to the calculated K ratio and thus the degradation of the printing quality can be avoided.

20 Claims, 7 Drawing Sheets

U.S. PATENT DOCUMENTS

| | | | | |
|---|---|---|---|---|
| 5,732,293 A * | 3/1998 | Nonaka et al. | | 396/56 |
| 5,774,238 A * | 6/1998 | Tsukada | | 358/529 |
| 5,937,089 A * | 8/1999 | Kobayashi | | 358/518 |
| 5,943,448 A * | 8/1999 | Tatsuta | | 382/270 |
| 5,982,455 A * | 11/1999 | Steele et al. | | 348/631 |
| 5,982,921 A * | 11/1999 | Alumot et al. | | 382/145 |
| 6,118,558 A * | 9/2000 | Ohashi et al. | | 358/518 |
| 6,172,776 B1 * | 1/2001 | Murai et al. | | 358/529 |
| 6,219,460 B1 * | 4/2001 | Tatsuta | | 382/270 |
| 6,229,915 B1 * | 5/2001 | Ohkubo | | 358/518 |
| 6,297,826 B1 * | 10/2001 | Semba et al. | | 345/589 |
| 6,303,242 B1 * | 10/2001 | Leddy et al. | | 429/10 |
| 6,337,923 B1 * | 1/2002 | Yoon et al. | | 358/520 |
| 6,377,366 B1 * | 4/2002 | Usami | | 358/520 |
| 6,449,004 B1 * | 9/2002 | Okisu et al. | | 348/50 |
| 6,522,778 B1 * | 2/2003 | Tamagawa | | 358/520 |
| 6,611,356 B1 * | 8/2003 | Shimizu et al. | | 358/1.9 |
| 6,704,442 B2 * | 3/2004 | Haikin et al. | | 382/162 |
| 6,773,175 B2 * | 8/2004 | Yamamoto | | 358/1.9 |
| 6,842,160 B2 * | 1/2005 | Yamazaki et al. | | 345/76 |
| 6,879,417 B1 * | 4/2005 | Tabata et al. | | 358/529 |
| 6,894,810 B2 * | 5/2005 | Walmsley | | 358/1.9 |
| 6,992,683 B2 * | 1/2006 | Shin et al. | | 382/167 |
| 7,019,868 B2 * | 3/2006 | Chang et al. | | 358/2.1 |
| 7,106,474 B1 * | 9/2006 | Haikin et al. | | 358/1.9 |
| 7,129,958 B2 * | 10/2006 | Newman et al. | | 358/1.9 |
| 7,167,276 B2 * | 1/2007 | Wang et al. | | 358/1.9 |
| 7,167,277 B2 * | 1/2007 | Shimizu et al. | | 358/1.9 |
| 7,171,055 B2 * | 1/2007 | Morton | | 382/269 |
| 7,173,736 B2 * | 2/2007 | Yamada | | 358/1.9 |
| 7,184,174 B2 * | 2/2007 | Aotsuka | | 358/1.9 |
| 7,199,900 B2 * | 4/2007 | Ogatsu et al. | | 358/1.9 |
| 7,206,100 B2 * | 4/2007 | Namikata | | 358/3.23 |
| 7,304,767 B2 * | 12/2007 | Sasaki et al. | | 358/1.9 |
| 7,307,753 B2 * | 12/2007 | Sasaki et al. | | 358/1.9 |
| 7,385,739 B2 * | 6/2008 | Ohga et al. | | 358/518 |
| 2001/0035968 A1 * | 11/2001 | Higashikata et al. | | 358/1.9 |
| 2002/0081424 A1 * | 6/2002 | Haas et al. | | 428/323 |
| 2002/0122489 A1 * | 9/2002 | Kuniba | | 375/240.21 |
| 2003/0053094 A1 * | 3/2003 | Ohga et al. | | 358/1.9 |
| 2003/0072016 A1 * | 4/2003 | Dalrymple et al. | | 358/1.9 |
| 2003/0076336 A1 * | 4/2003 | Fukao et al. | | 345/589 |
| 2003/0133138 A1 * | 7/2003 | Namikata | | 358/1.9 |
| 2004/0075852 A1 * | 4/2004 | Wang et al. | | 358/1.9 |
| 2004/0109179 A1 * | 6/2004 | Haikin et al. | | 358/1.9 |
| 2004/0114166 A1 * | 6/2004 | Kubo | | 358/1.9 |
| 2004/0184677 A1 * | 9/2004 | Raskar et al. | | 382/284 |
| 2005/0047654 A1 * | 3/2005 | Newman et al. | | 382/167 |
| 2005/0094169 A1 * | 5/2005 | Berns et al. | | 358/1.9 |
| 2005/0094871 A1 * | 5/2005 | Berns et al. | | 358/1.9 |
| 2005/0179915 A1 * | 8/2005 | Tsukada | | 358/1.9 |
| 2005/0190967 A1 * | 9/2005 | Ok et al. | | 358/518 |
| 2005/0275911 A1 * | 12/2005 | Yamada et al. | | 358/518 |
| 2006/0007406 A1 * | 1/2006 | Adkins et al. | | 353/82 |
| 2006/0012809 A1 * | 1/2006 | Shimada | | 358/1.9 |
| 2006/0061786 A1 * | 3/2006 | Cho et al. | | 358/1.9 |
| 2006/0062562 A1 * | 3/2006 | Utagawa | | 396/213 |
| 2006/0170940 A1 * | 8/2006 | Kang et al. | | 358/1.9 |
| 2006/0170941 A1 * | 8/2006 | Kang et al. | | 358/1.9 |
| 2006/0182336 A1 * | 8/2006 | Cho et al. | | 382/162 |
| 2006/0274341 A1 * | 12/2006 | Kumada et al. | | 358/1.9 |
| 2006/0274342 A1 * | 12/2006 | Haikin et al. | | 358/1.9 |
| 2006/0285137 A1 * | 12/2006 | Namikata | | 358/1.9 |
| 2007/0041026 A1 * | 2/2007 | Tin | | 358/1.9 |
| 2007/0052719 A1 * | 3/2007 | Tin | | 345/590 |
| 2007/0086027 A1 * | 4/2007 | Tin | | 358/1.9 |

* cited by examiner

COLOR DATA CONVERSION APPARATUS AND METHOD USING GAMUT BOUNDARY DESCRIPTORS

CROSS-REFERENCE TO RELATED APPLICATIONS

This application claims priority from Korean Patent Application No. 10-2005-12712 filed on Feb. 16, 2005, and Korean Patent Application No. 10-2006-5007 filed on Jan. 17, 2006, in the Korean Intellectual Property Office, the entire disclosures of which are incorporated herein by reference.

BACKGROUND OF THE INVENTION

1. Field of The Invention

Apparatuses and methods consistent with the present invention relate generally to color data conversion. More particularly, the present invention relates to a color data conversion apparatus and method which determines a K ratio using gamut boundary descriptors corresponding to the K ratio when converting entered color data to CMYK data.

2. Description of The Related Art

Most printing apparatuses commercially available on the market make use of four colorants of C (cyan), M (magenta), Y (yellow), and K (black). The addition of the K colorant can expand the color gamut and attain cost-effectiveness.

An apparatus is demanded to convert entered color data (e.g., Lab data) to CMYK data used by the printing apparatus. Hereinafter, such an apparatus is referred to as a color data conversion apparatus.

When converting the entered color data to the CMYK data, the color data conversion apparatus first calculates a K ratio and then C, M, and Y ratios based on the calculated K ratio.

Much research and discussion has occurred regarding methods for calculating the K ratio. However, no research or discussion has focused on a K ratio calculation method which verifies whether the printing apparatus is able to substantially print according to the calculated K ratio.

If such verification is conducted and the calculated K ratio is adjusted according to the verification result to avoid in advance the infeasible printing based on the calculated K ratio, the printing quality can be significantly improved. Thus, a new color data conversion method is desired by taking account of the verification as to the substantial feasibility of the printing work depending on the calculated K ratio by the printing apparatus.

SUMMARY OF THE INVENTION

The present invention has been provided to address the above-mentioned and other problems and disadvantages occurring in the conventional arrangement, and an aspect of the present invention provides a color data conversion apparatus and method for determining a K ratio using gamut boundary descriptors corresponding to the K ratio during conversion of entered color data to CMYK data so as to calculate the K ratio that is substantially printable by an printing apparatus.

To achieve the above aspect and/or features of the present invention, a color data conversion apparatus includes a K ratio calculator for outputting a K ratio that is calculated using entered color data; a K ratio adjuster for adjusting the calculated K ratio, which is output from the K ratio calculator, based on K gamut boundary descriptors (GBDs) and outputting a final K ratio; and a CMY ratio calculator for calculating C, M, and Y ratios based on the final K ratio.

If the entered color data resides within a gamut defined by a GBD according to a first K ratio and within a gamut defined by a GBD according to a second K ratio that is greater than the first K ratio, the K ratio adjuster may output the calculated K ratio as the final K ratio when the calculated K ratio is greater than the first K ratio and less than the second K ratio.

The K ratio adjuster may output the first K ratio as the final K ratio when the calculated K ratio is less than the first K ratio.

The K ratio adjuster may output the second K ratio as the final K ratio when the calculated K ratio is greater than the second K ratio.

The K ratio calculator may obtain an initial K ratio which is a K ratio corresponding to a lightness of the entered color data, and acquire the calculated K ratio using the obtained initial K ratio by use of a graph that is produced by drawing a curve line corresponding to a certain rate of change from a point corresponding to a maximum K ratio to a point corresponding to a start lightness in a coordinate.

The K ratio calculator may calculate the K ratio by multiplying a generated output ratio and the initial K ratio using a function that has a chroma of the entered color data as an input variable.

The function used by the K ratio calculator may produce the output ratio to fall below a predetermined value when the input chroma resides outside a predetermined chroma range.

The color data conversion apparatus may further include a converter for converting the entered color data to color data that resides within a gamut defined by a total GBD that covers all gamuts defined by the GBDs corresponding to the K ratio, and supplying the converted color data to the K ratio calculator. The K ratio calculator may calculate a first weight using a lightness of an input achromatic color and a start lightness, set a maximum K ratio and a minimum K ratio to its upper limit K ratio and lower limit K ratio, respectively, and calculate the K ratio using the first weight. The upper limit K ratio and the lower limit K ratio, the input achromatic color has the same lightness as that of an input color corresponding to an input color data, and the maximum K ratio and the minimum K ratio are determined among the K ratios corresponding to the K GBDs that cover the input achromatic color.

The K ratio calculator calculates the first weight (weight 1) and the K ratio by the following equations:

$$\text{Weight } 1 = 1 - \left( \frac{\textit{Lightness} \text{ of input achromatic color}}{\text{Start } \textit{Lightness } L_{start}} \right); \text{ and}$$

K ratio=(1−weight 1)(lower limit K ratio)+(weight 1)(upper limit K ratio).

The K ratio calculator may set the K ratio to '0', if it is determined that the lightness of the input achromatic color is greater than the start lightness.

The K ratio adjuster may calculate a second weight using a chroma of an input color corresponding to an input color data, set a maximum K ratio and a minimum K ratio to its upper limit K ratio and lower limit K ratio, respectively, and calculate the final K ratio using the second weight, the upper limit K ratio and the lower limit K ratio. Here, the maximum K ratio and the minimum K ratio are determined among the K ratios corresponding to the K GBDs that cover the input color and correspond to the K ratio equal to or less than the K ratio calculated by the K ratio calculator.

The K ratio calculator may calculate the second weight (weight 2) and the final K ratio by the following equation:

$$\text{weight } 2 = 1 - \sqrt{\frac{\text{chroma of input } color^3}{\text{chroma of input } color^3 + 500{,}000}} \text{ ; and}$$

final $K$ ratio=(1−weight 2)(lower limit $K$ ratio)+ (weight 2)(upper limit $K$ ratio).

The K ratio adjuster may set the K ratio calculated by the K ratio calculator, to the final K ratio if the chroma of the input color corresponding to the input color data is "0".

In accordance with the aspect of the present invention, a color data conversion method includes calculating a K ratio using entered color data; adjusting the calculated K ratio in reference to gamut boundary descriptors (GBDs) corresponding to a K ratio and outputting a final K ratio; and calculating C, M, and Y ratios based on the final K ratio.

If the entered color data resides within a gamut defined by a GBD corresponding to a first K ratio and within a gamut defined by a GBD corresponding to a second K ratio that is greater than the first K ratio, the adjusting of the K ratio may output the calculated K ratio as the final K ratio when the calculated K ratio is greater than the first K ratio and less than the second K ratio.

The adjusting of the K ratio may output the first K ratio as the final K ratio when the calculated K ratio is less than the first K ratio.

The adjusting of the K ratio may output the second K ratio as the final K ratio when the calculated K ratio is greater than the second K ratio.

The calculating of the K ratio may obtains an initial K ratio which is a K ratio corresponding to a lightness of the entered color data, and acquire the calculated K ratio using the obtained initial K ratio by use of a graph that is produced by drawing a curve line corresponding to a certain rate of change from a point corresponding to a maximum K ratio to a point corresponding to a start lightness in a coordinate.

The K ratio may be calculated by multiplying a generated output ratio and the initial K ratio using a function that has a chroma of the entered color data as an input variable.

The function used for the calculation of the K ratio may produce the generated output ratio to fall below a predetermined value when the input chroma resides outside a predetermined chroma range.

The color data conversion method may further include converting the entered color data to color data that resides within a gamut defined by a total GBD that covers all gamuts defined by the GBDs corresponding to the K ratio, and outputting the converted color data to calculate the K ratio. The calculating of the K ratio may include the operations of calculating a first weight using a lightness of an input achromatic color and a start lightness, the input achromatic color having the same lightness as that of an input color corresponding to an input color data, setting a maximum K ratio and a minimum K ratio to its upper limit K ratio and lower limit K ratio, respectively, the maximum K ratio and the minimum K ratio determined among the K ratios corresponding to the K GBDs that cover the input achromatic color, and calculating the K ratio using the first weight, the upper limit K ratio and the lower limit K ratio.

The calculating of the K ratio may calculate the first weight (weight 1) and the K ratio by the following equations:

$$\text{Weight } 1 = 1 - \left(\frac{\text{Lightness of input achromatic color}}{\text{Start Lightness } L_{start}}\right) \text{; and}$$

$K$ ratio=(1−weight 1)(lower limit $K$ ratio)+(weight 1)(upper limit $K$ ratio).

The calculating of the K ratio may further include the operation of setting, if it is determined that the lightness of the input achromatic color is greater than the start lightness, the K ratio to '0'.

The adjusting of the K ratio may include the operations of calculating a second weight using a chroma of an input color corresponding to an input color data, setting a maximum K ratio and a minimum K ratio to its upper limit K ratio and lower limit K ratio, respectively, the maximum K ratio and the minimum K ratio determined among the K ratios corresponding to the K GBDs that cover the input color and correspond to the K ratio equal to or less than the K ratio calculated in the operation of the calculating of the K ratio, and calculating the final K ratio using the second weight, the upper limit K ratio and the lower limit K ratio.

The adjusting of the K ratio may calculate the second weight (weight 2) and the final K ratio by the following equation:

$$\text{weight } 2 = 1 - \sqrt{\frac{\text{chroma of input } color^3}{\text{chroma of input } color^3 + 500{,}000}} \text{ ; and}$$

final $K$ ratio=(1−weight 2)(lower limit $K$ ratio)+ (weight 2)(upper limit $K$ ratio).

The adjusting of the K ratio may further include the operation of setting, if the chroma of the input color corresponding to the input color data is '0', the K ratio calculated by the K ratio calculator, to the final K ratio.

BRIEF DESCRIPTION OF THE DRAWING FIGURES

These and/or other aspects of the invention will become apparent and more readily appreciated from the following description of exemplary embodiments, taken in conjunction with the accompanying drawing figures of which.

DETAILED DESCRIPTION OF THE EXEMPLARY EMBODIMENTS

Certain exemplary embodiments of the present invention will now be described in greater detail with reference to the accompanying drawings.

In the following description, same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the invention in unnecessary detail.

Figure 1:
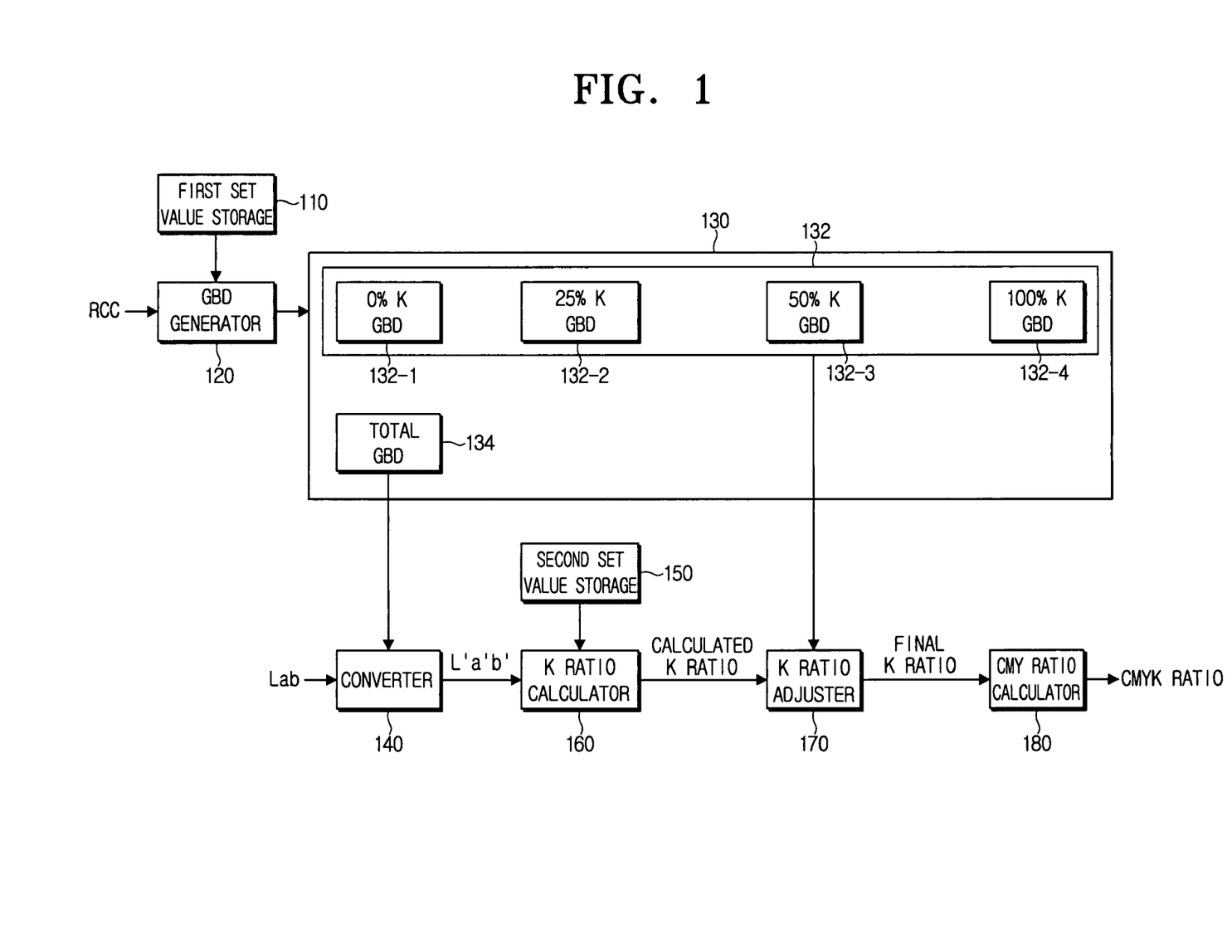
FIG. 1 is a block diagram of a color data conversion apparatus using gamut boundary descriptors (GBDs) according to an exemplary embodiment of the present invention.

FIG. 1 is a block diagram of a color data conversion apparatus according to an exemplary embodiment of the present invention. The color data conversion apparatus is responsible to convert entered color data to CMYK data processed by a printing apparatus. To convert the color data, the color data conversion apparatus determines a K ratio by use of GBDs corresponding to the K ratio and then determines C ratio, M ratio, and Y ratio.

Referring now to FIG. 1, the color conversion apparatus includes a first set value storage 110, a GBD generator 120, a GBD storage 130, a converter 140, a second set value storage 150, a K ratio calculator 160, a K ratio adjuster 170, and a CMY ratio calculator 180.

The GBD generator 120 generates GBDs by processing, such as converting and interpolating, with respect to a color-measured reference color chart and stores the generated GBDs in the GBD storage 130. The GBDs generated by the GBD generator 120 include GBDs corresponding to the K ratio, and total GBD.

The K ratio-based GBD, abbreviated K GBD, describes a boundary of the gamut that is obtained by adjusting C ratio, M ratio, and Y ratio upon determining the K ratio. In the exemplary embodiment of the present invention, it is assumed that the GBD generator 120 generates four K GBDs in total. In more detail, it is assumed that the GBD generator 120 generates only four K GBDs: i) a GBD as for the K ratio set to 0%, abbreviated 0% K GBD; ii) a GBD as for the K ratio set to 25%, abbreviated 25% K GBD; iii) a GBD as for the K ratio set to 50%, abbreviated 50% K GBD; and iv) a GBD as for the K ratio set to 100%, abbreviated 100% K GBD.

Figure 2A:
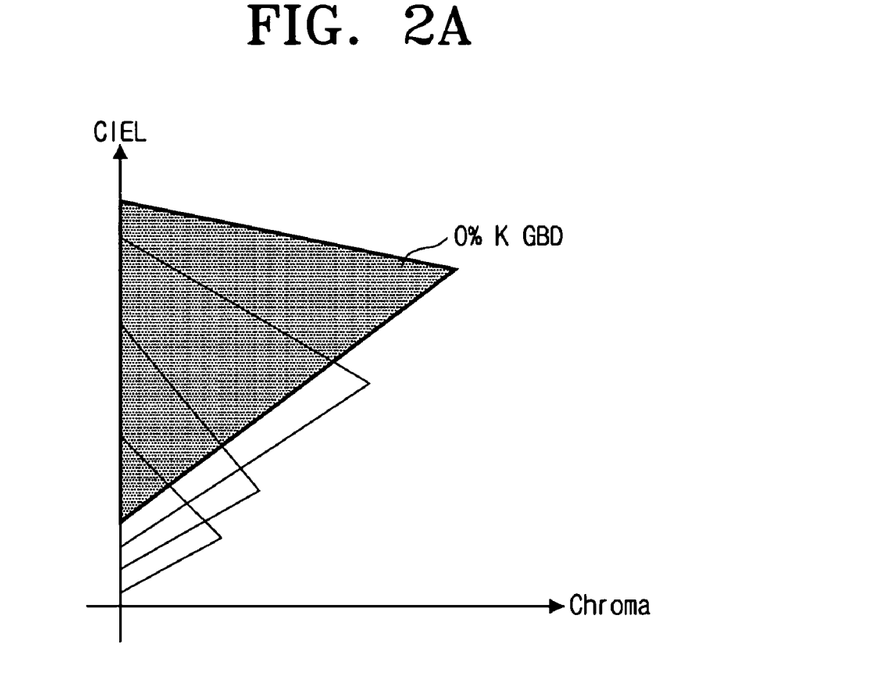
FIGS. 2A through 2D are diagrams showing K GBDs.
Figure 2B:
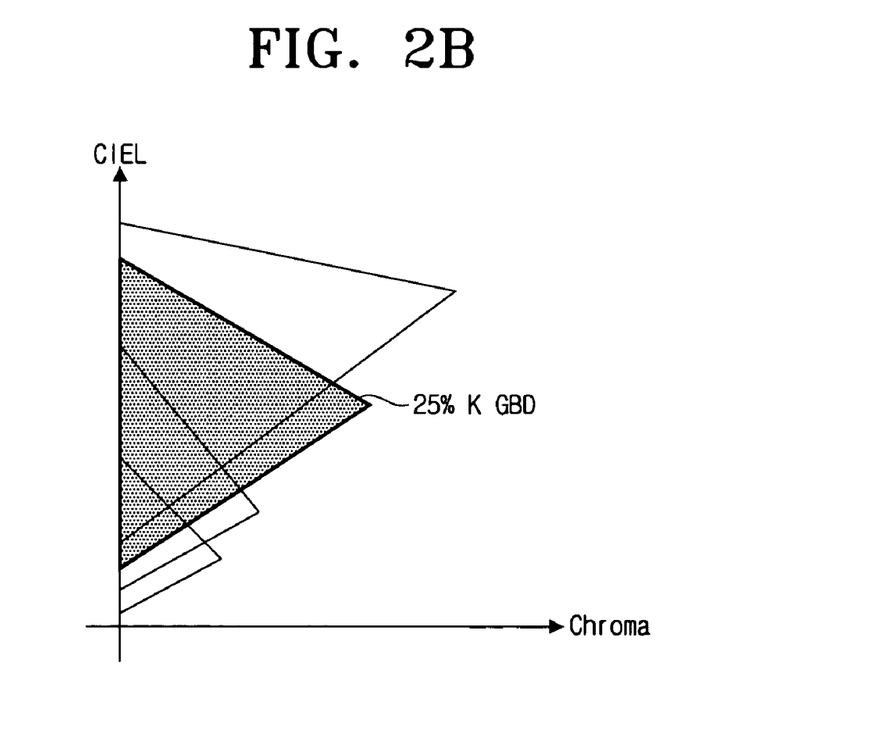
Figure 2C:
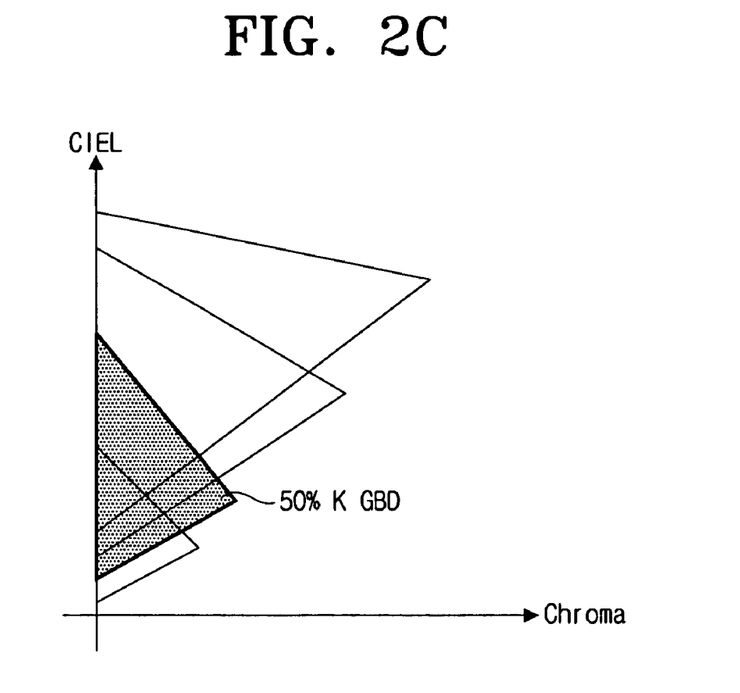
Figure 2D:
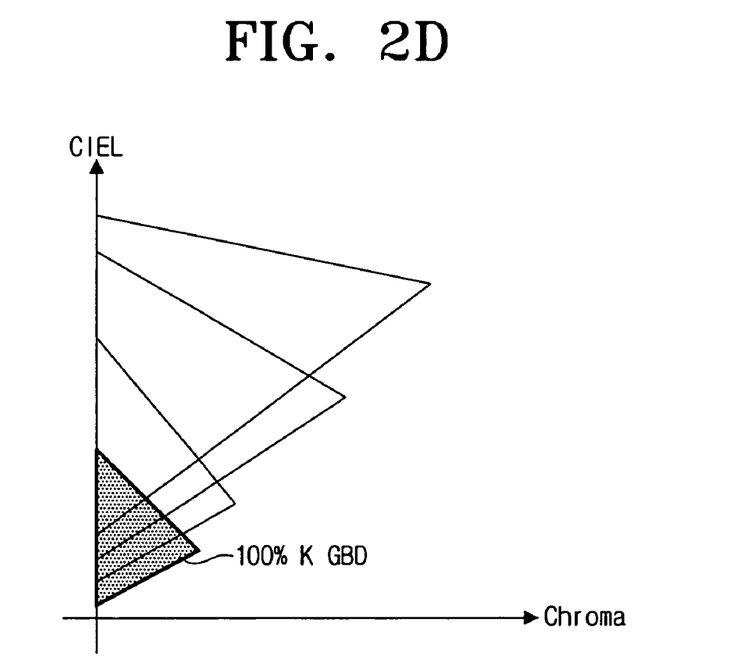

Thus, the GBD storage 130 stores four K GBDs 132-1 through 132-4. The K GBDs 132-1 through 132-4 are shown in FIG. 2A through FIG. 2D, respectively. Specifically, a boundary of a shaded area in FIG. 2A represents the 0% K GBD, a boundary of a shaded area in FIG. 2B represents the 25% K GBD, a boundary of a shaded area in FIG. 2C represents the 50% K GBD, and a boundary of a shaded area in FIG. 2D represents the 100% K GBD.

Figure 3:
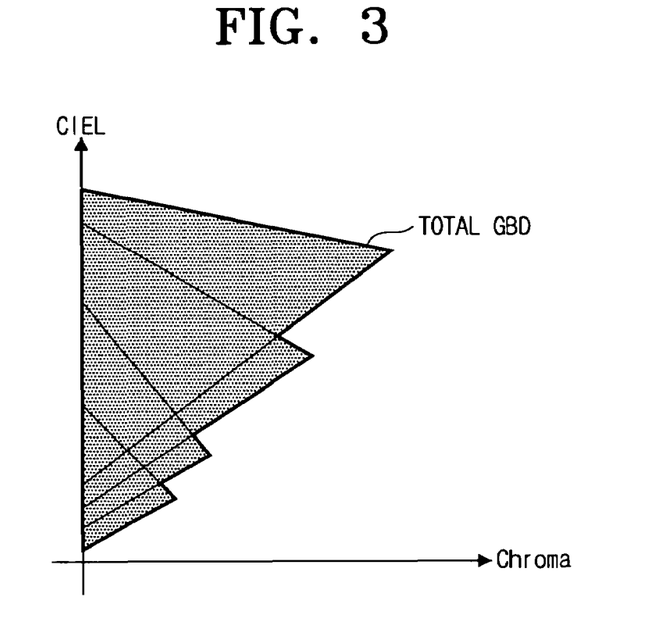
FIG. 3 is a diagram showing a total GBD.

The total GBD describes a gamut boundary that covers all the gamuts defined by the K GBDs 132 generated by the GBD generator 120. Only one total GBD 140 is generated by the GBD generator 120 and stored in the GBD storage 130. FIG. 3 shows the total GBD 134 covering all the gamuts defined by the four GBDs 132-1 through 132-4 according to an exemplary embodiment of the present invention.

When generating the GBDs, the GBD generator 120 refers to a GBD generation set value that is stored in the first set value storage 110. Non-limiting examples of the GBD generation set value include: i) a total area coverage (TAC) which is a maximum value of summation of the C ratio, the M ratio, the Y ratio, and the K ratio (e.g., 400%); and ii) a maximum value of the K ratio (e.g., 100%). It is noted that the GBD generation set value is changeable if necessary.

The reference color chart may adopt ECI 2002 reference color chart, IT 8.7/3 reference color chart, TC 3.5 reference color chart, and the like. Other reference color charts besides these are permissible.

The converter 140 converts the entered color data to color data residing in the color gamut defined by the total GBD 134.

The K ratio calculator 160 calculates the K ratio using the converted color data that is output from the converter 140. The K ratio calculator 160 obtains the K ratio through operations based on the converted color data and K ratio calculation set values that are stored in the second set value storage 150.

The K ratio adjuster 170 adjusts the K ratio obtained by the K ratio calculator 160 in reference to the K GBDs 132.

The CMY ratio calculator 180 calculates the C ratio, the M ratio, and the Y ratio, respectively, based on the final K ratio. Hence, the ratio of C, M, Y, and K is output from the CMY ratio calculator 180.

In the following, more detailed descriptions are provided in reference to FIG. 4 on how the converter 140, the K ratio calculator 150, the K ratio adjuster 170, and the CMY ratio calculator 180 convert the entered color data to the CMYK data using the GBDs 132 and 134 that are generated by the GBD generator 120 and stored in the GBD 130. To facilitate the understanding of the present invention, assume that the entered color data is Lab data.

Figure 4:
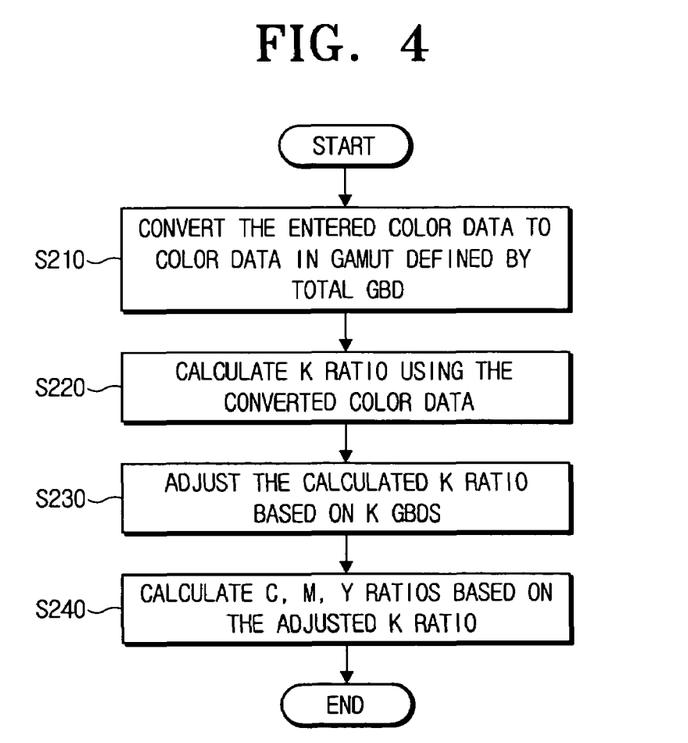
FIG. 4 is a flowchart outlining a color data conversion method using GBDs according to an exemplary embodiment of the present invention.

FIG. 4 is a flowchart outlining a color data conversion method using the GBDs according to an exemplary embodiment of the present invention.

Referring to FIG. 4, the converter 140 converts the entered Lab data to L'a'b' data in the color gamut defined by the total GBD 134 (S210). The color gamut defined by the total GBD 134 is represented as the shaded area in FIG. 3.

Next, the K ratio calculator 160 calculates the K ratio using the converted L'a'b' color data (S220). In further detail, the K ratio calculator 160 obtains the K ratio through operations using the L'a'b' data and the K ratio calculation set values that are pre-stored. The pre-stored K ratio calculation set values include: i) a maximum K ratio $K_{max}$; ii) a start lightness $L_{start}$; iii) a gamma G; and iv) a chroma width CW. The start lightness $L_{start}$ takes on a value between a lightness corresponding to 'Printer Black' and a lightness corresponding to 'Paper White'. The K ratio calculation set values are changeable if necessary.

Hereafter, the operation of the K ratio calculator 160 will be discussed.

Figure 5A:
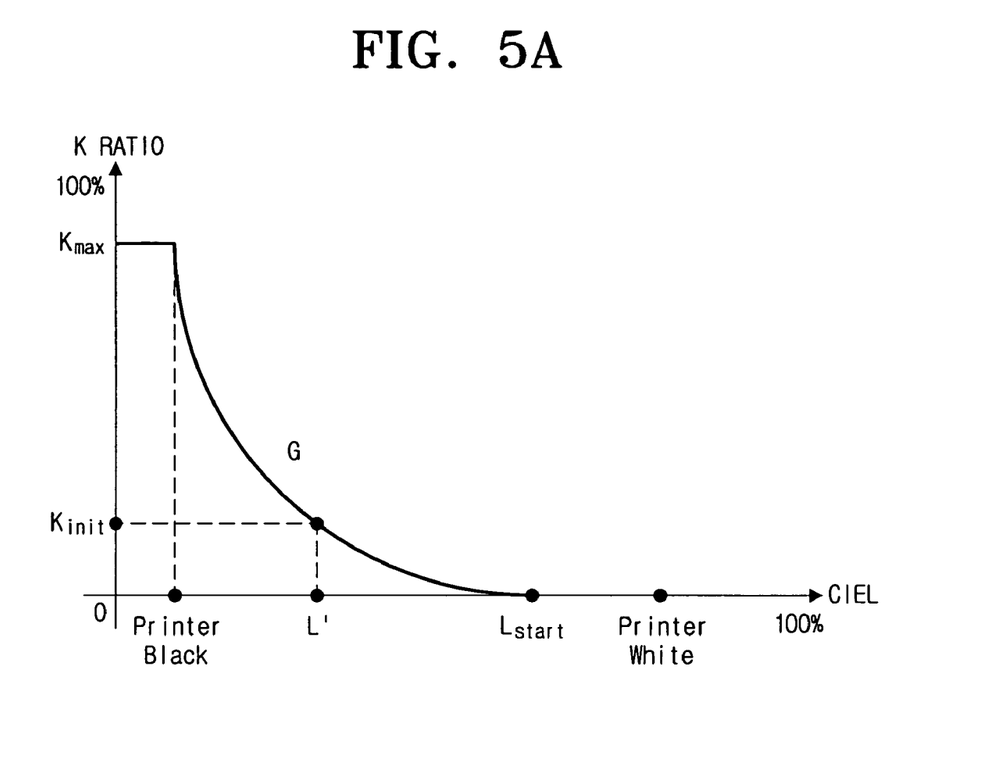
FIG. 5A is a diagram illustrating a K ratio calculation.

The K ratio calculator 160 draws a curve line from (Printer Black, $K_{max}$) to ($L_{start}$, 0) corresponding to a rate of change of G in a coordinate defined by a CIEL axis and a K ratio axis, and thus produces a graph as shown in FIG. 5A.

Next, the K ratio calculator 160 calculates an initial K ratio $K_{init}$ which is a K ratio corresponding to a lightness L' of a color for the entered L'a'b' data (hereinafter, referred to as an input color).

The K ratio calculator 160 calculates a chroma C' of the input color using a' data and b' data. The chroma C' is obtained from Equation 1.

$$C' = \sqrt{(a')^2 + (b')^2}. \qquad \text{[Equation 1]}$$

The K ratio calculator 160 substitutes the obtained C' into a Gaussian function $f(C)$ having the chroma as an input variable and thus obtains an output ratio $f(C')$. Here, $f(C)$ produces the output ratio ranging between 0 and 1 corresponding to the Gaussian distribution when the input chroma resides within the chroma width CW, but produces zero as the output ratio when the input chroma resides outside the chroma width CW. Characteristics of ƒ(C) can be expressed as the following equations.

$$f(C) = 0 \sim 1 \text{ \{when } C \text{ resides within a predetermined } CW\}$$

$$0 \text{ \{when } C \text{ resides outside a predetermined } CW\}$$

The K ratio calculator 160 multiples the obtained $K_{init}$ and ƒ(C'), and outputs the multiplication $K_{init} \times f(C')$ as the K ratio. The output K ratio is given by Equation 2.

$$K \text{ ratio} = K_{init} \times f(C'). \quad \text{[Equation 2]}$$

When the calculation of the K ratio is completed, the K ratio adjuster 170 adjusts the obtained K ratio in reference to the K GBDs 132 (S230). The adjustment of the K ratio is discussed below.

First, the K ratio adjuster 170 determines whether the input color, which corresponds to the color data L'a'b', resides within the color gamut defined by the K GBDs 132-1 through 132-4. Such a determination is conducted for every K GBD 132-1 through 132-4. In specific, the K ratio adjuster 170 determines whether the input color resides: i) within the gamut defined by 0% K GBD 132-1; ii) within the gamut defined by 25% K GBD 132-2; iii) within the gamut defined by 50% K GBD 132-3; and iv) within the gamut defined by 100% K GBD 132-4, in that order.

Next, the K ratio adjuster 170 sets a K ratio range based on a result of the determination. The K ratio range has a maximum ratio and a minimum ratio of the K ratios corresponding to the K GBDs that cover the input color, as its upper limit K ratio and lower limit K ratio, respectively.

Figure 5B:
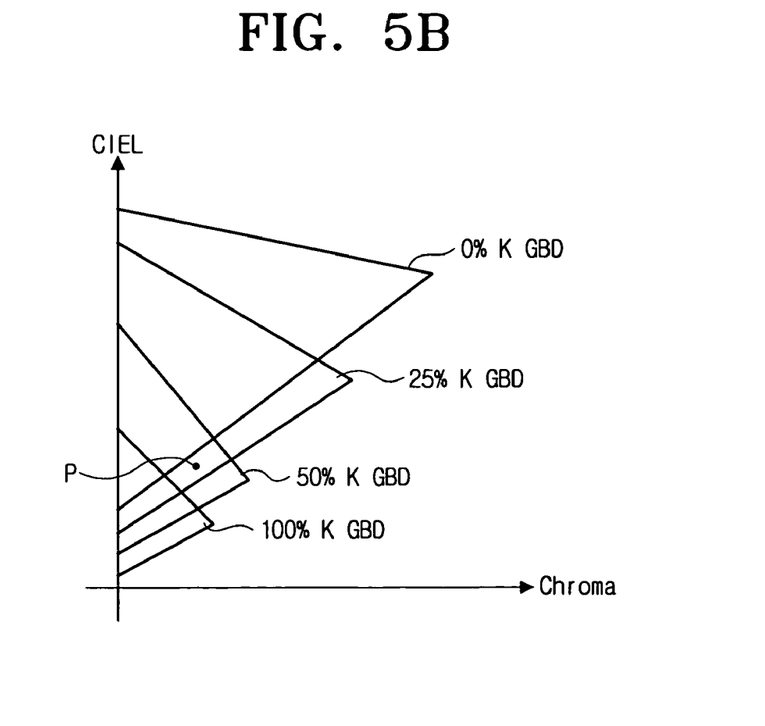
FIG. 5B is a diagram illustrating a calculation of a K ratio range.

To provide further detailed descriptions on the K ratio range, it is assumed that an input color P resides inside the gamuts of the 25% K GBD 132-2 and the 50% K GBD 132-3 and outside the gamuts of the 0% K GBD 132-1 and the 100% K GBD 132-4, as shown in FIG. 5B. Then, as for the K ratios 25% and 50% of the K GBDs 132-2 and 132-3 covering the input color P, the maximum K ratio is 50% and the minimum K ratio is 25%. That is, the K ratio range has its upper limit K ratio 50% and the lower limit K ratio 25%.

Next, the K ratio adjuster 170 adjusts the calculated K ratio by comparing the set K ratio range and the K ratio obtained in operation S220. In specific, the K ratio adjuster 170 determines whether the calculated K ratio falls within the K ratio range and adjusts the calculated K ratio according to a result of the determination.

In further detail, when the calculated K ratio is greater than the lower limit K ratio $K_{low}$ and less than the upper limit K ratio $K_{high}$, the K ratio adjuster 170 sets the calculated K ratio as a final K ratio. Conversely, when the calculated K ratio is less than $K_{low}$, the K ratio adjuster 170 sets $K_{low}$ as the final K ratio. When the calculated K ratio is greater than $K_{high}$, the K ratio adjuster 170 sets $K_{high}$ as the final K ratio. These operations can be expressed as follows:

if $K_{low} \leq$ calculated $K$ ratio $\leq K_{high}$, final $K$
ratio=calculated $K$ ratio;  ① if calculated $K$ ratio $< K_{low}$, final $K$ ratio$=K_{low}$;  ② if calculated $K$ ratio $> K_{high}$, final $K$ ratio$=K_{high}$.  ③

In FIG. 5B, $K_{high}$ of the K ratio range with respect to the input color P is 50% and $K_{low}$ is 25% as explained earlier. Provided that the K ratio calculated for the input color P in operation S220 is 35%, the calculated K ratio 35% is set to the final K ratio because the calculated K ratio 35% exceeds $K_{low}$ 25% and falls below $K_{high}$ 50%. Provided that the calculated K ratio is 20%, $K_{low}$ 25% is set to the final K ratio because the calculated K ratio 20% falls below $K_{low}$ 25%. Provided that the calculated K ratio is 55%, $K_{high}$ 50% is set to the final K ratio since the calculated K ratio 55% exceeds $K_{high}$ 50%.

When the adjustment of the K ratio is completed, the CMY ratio calculator 180 calculates C ratio, M ratio, and Y ratio based on the final K ratio that is adjusted by the K ratio adjuster 170 (S240). As a result, the ratio of the C, M, Y, and K colorants are output from the CMY ratio calculator 180.

Hereafter, the operations of K ratio calculator 160 for calculating the K ratio according to another scheme and the operations of K ratio adjuster 170 for adjusting the calculated K ratio according to another scheme will be explained in detail.

Firstly, the operations of the K ratio calculator 160 for calculating the K ratio will be discussed.

The K ratio calculator 160 calculates the K ratio using the converted L'a'b' color data.

At this time, the K ratio calculator 160 obtains the K ratio through operations using the L'a'b' data and the K ratio calculation set values that are pre-stored. The pre-stored K ratio calculation set values include: i) a start lightness $L_{start}$; and ii) K ratio range $K_{range}$. The start lightness $L_{start}$ takes on a value between a lightness corresponding to 'Printer Black' and a lightness corresponding to 'Paper White'.

K ratio range $K_{range}$ is a range for the K GBDs, which are referred for the determination when it is determined whether 'an achromatic color with the same lightness as that of the input color (hereinafter, 'input achromatic color') resides within a gamut defined by the K GBDs 132-1~132-4. The K ratio range $K_{range}$ may be arbitrarily set.

The operations of the K ratio calculator 160 will be in further detail explained hereafter.

Figure 6:
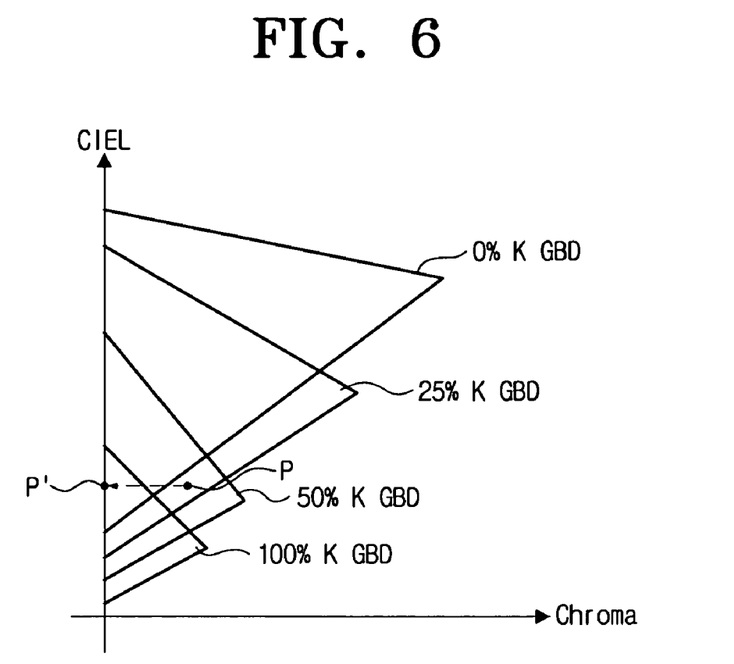
FIG. 6 is a diagram illustrating a process of obtaining an input achromatic color.

First, the K ratio calculator 160 obtains the input achromatic color (achromatic color with the same lightness as that of the input color) using the converted L'a'b' color data. At this time, the K ratio calculator 160 may obtain the input achromatic color through L'data among the L'a'b' data. In other words, the K ratio calculator 160 projects the input color P onto CIEL axis to obtain the input achromatic color P' as shown in FIG. 6.

Then, the K ratio calculator 160 compares the lightness of the input achromatic color with the start lightness $L_{start}$. If it is determined that the lightness of the input achromatic color is greater than the start lightness $L_{start}$, the K ratio calculator 160 sets the K ratio to '0'.

Conversely, when the lightness of the input achromatic color is equal to or less than the start lightness $L_{start}$, the K ratio calculator 160 calculates 'weight 1' using the following Equation 3:

$$\text{Weight } 1 = 1 - \left( \frac{Lightness \text{ of input achromatic color}}{\text{Start } Lightness \text{ } L_{start}} \right).$$

According to equation 3, if the lightness of the input achromatic color is higher, i.e., if the input achromatic color is brighter, weight 1 has smaller value, and if the lightness of the input achromatic color is lower, i.e., if the input achromatic color is darker, weight 1 has greater value.

Then, the K ratio calculator 160 determines whether the input achromatic color resides within a gamut defined by the K GBDs 132-1~132-4. The K GBDs are set according to the K ratio range $K_{range}$.

For example, if the K ratio range $K_{range}$ is set between 0%~70, the K ratio calculator 160 determines whether the input achromatic color resides: i) within the gamut defined by 0% K GBD 132-1; ii) within the gamut defined by 25% K GBD 132-2; iii) within the gamut defined by 50% K GBD 132-3; however, the K ratio calculator 160 does not determine whether the input achromatic color resides iv) within the gamut defined by 100% K GBD 132-4.

Then, the K ratio calculator 160 sets a maximum K ratio and a minimum K ratio to its upper limit K ratio and lower limit K ratio, respectively, based on a result of the determination. The maximum K ratio and the minimum K ratio are determined among the K ratios corresponding to the K GBDs that cover the input achromatic color.

In case of the input achromatic color P' of FIG. 6, the input achromatic color P' resides within the gamuts defined by the 0% K GBD 132-1, the 25% K GBD 132-2 and the 50% K GBD 132-3. Therefore, the upper limit K ratio is 50% and the lower limit K ratio is 0%.

The K ratio calculator 160 substitutes weight 1, the upper limit K ratio and the lower limit K ratio into the following equation 4 to obtain the K ratio.

$$K\ \text{ratio} = (1 - \text{weight 1})(\text{lower limit } K\ \text{ratio}) + (\text{weight 1})(\text{upper limit } K\ \text{ratio}). \quad [\text{Equation 4}]$$

According to equation 4, if weight 1 is greater, i.e., if the lightness of the input achromatic color is lower, the K ratio is greatly influenced by the upper limit K ratio, and if weight 1 is smaller, i.e., if the lightness of the input achromatic color is higher, the K ratio is greatly influenced by the lower limit K ratio.

Hereafter, the operations of the K ratio adjuster 170 for adjusting the calculated K ratio will be explained.

When the calculation of the K ratio is completed, the K ratio adjuster 170 adjusts the obtained K ratio with reference to the K GBDs 132. Hereafter, the adjustment of the K ratio is discussed.

First, the K ratio adjuster 170 obtains a chroma of the input color using the converted L'a'b' color data.

If the chroma of the input color is '0', i.e., if the input color is achromatic color, the K ratio adjuster 170 does not adjust the calculated K ratio. In other words, the K ratio adjuster 170 sets the K ratio calculated by the K ratio calculator 160 to a final K ratio.

Conversely, if the chroma of the input color is not '0', i.e., if the input color is chromatic color, the K ratio adjuster 170 substitutes the chroma of the obtained input color into the following equation 5 to calculate weight 2.

$$\text{weight 2} = 1 - \sqrt{\frac{\text{chroma of input color}^3}{\text{chroma of input color}^3 + 500,000}}. \quad [\text{equation 5}]$$

Figure 7:
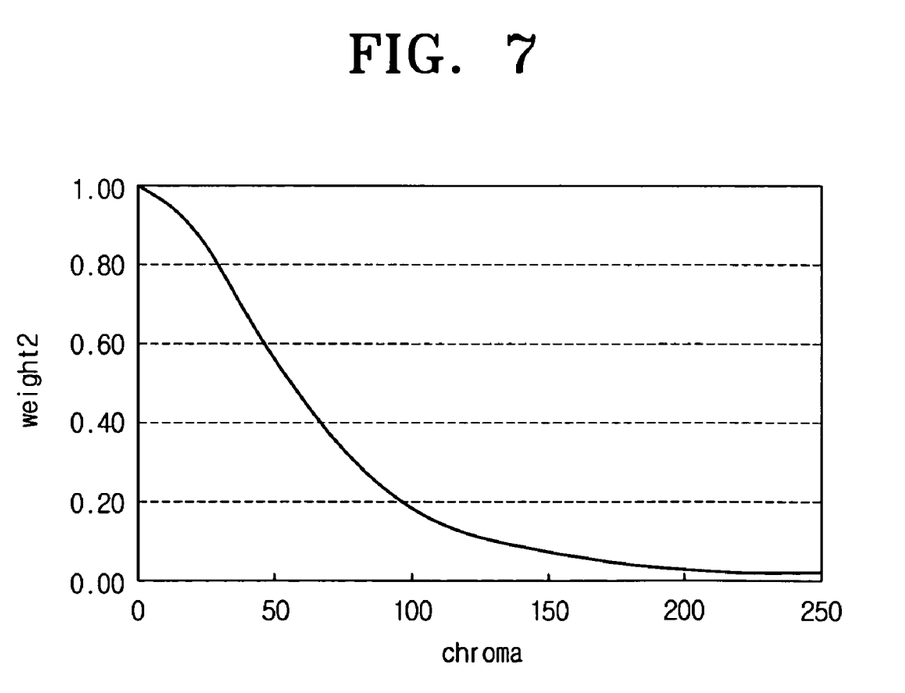
FIG. 7 is a graph for equation 5.

FIG. 7 is a graph for equation 5. According to equation 5 and FIG. 7, if the chroma of the input color is higher, weight 2 has smaller value, and if the chroma of the input is lower, weight 2 has greater value.

The K ratio adjuster 170 determines whether the input color resides within a gamut defined by the K GBDs 132-1~132-4. At this time, the K GBDs used for the determination are set according to the K ratio calculated by the K ratio calculator 160. In detail, the K GBDs referred to for the determination correspond to the K ratio equal to or less than the K ratio calculated by the K ratio calculator 160.

For example, if the K ratio calculated by the K ratio calculator 160 is 60%, the K ratio adjuster 170 determines whether the input color resides: i) within the gamut defined by 0% K GBD 132-1; ii) within the gamut defined by 25% K GBD 132-2; iii) within the gamut defined by 50% K GBD 132-3; however, the K ratio adjuster 170 does not determine whether the input color resides iv) within the gamut defined by 100% K GBD 132-4.

Then, the K ratio adjuster 170 sets a maximum K ratio and a minimum K ratio to its upper limit K ratio and lower limit K ratio, respectively, based on a result of the determination. The maximum K ratio and the minimum K ratio are determined among the K ratios corresponding to the K GBDs that cover the input color.

In case of the input color P of FIG. 6, the input color P resides inside the gamuts defined by the 25% K GBD 132-2 and the 50% K GBD 132-3, but outside the gamuts of the 0% K GBD 132-1 and the 100% K GBD 132-4. Therefore, the upper limit K ratio is 50% and the lower limit K ratio is 25%.

The K ratio adjuster 170 substitutes weight 2, the upper limit K ratio and the lower limit K ratio into the following equation 6 to obtain the final K ratio.

$$\text{final } K\ \text{ratio} = (1 - \text{weight 2})(\text{lower limit } K\ \text{ratio}) + (\text{weight 2})(\text{upper limit } K\ \text{ratio}). \quad [\text{equation 6}]$$

According to equation 6, if weight 2 is greater, i.e., if the chroma of the input color is lower, the K ratio is greatly influenced by the upper limit K ratio, and if weight 2 is smaller, i.e., if the chroma of the input achromatic color is higher, the K ratio is greatly influenced by the lower limit K ratio.

In the exemplary embodiment of the present invention, four K GBDs are generated and used to convert the color data. It should be understood that the present invention is not limited to this number of K GBDs. For example, it is permissible to generate six K GBDs (0% K GBD, 20% K GBD, 40% K GBD, 60% K GBD, 80% K GBD, and 100% K GBD) and convert the color data using them.

Additionally, an additional number of K GBDs may be generated by interpolating existing K GBDs.

Figure 8A:
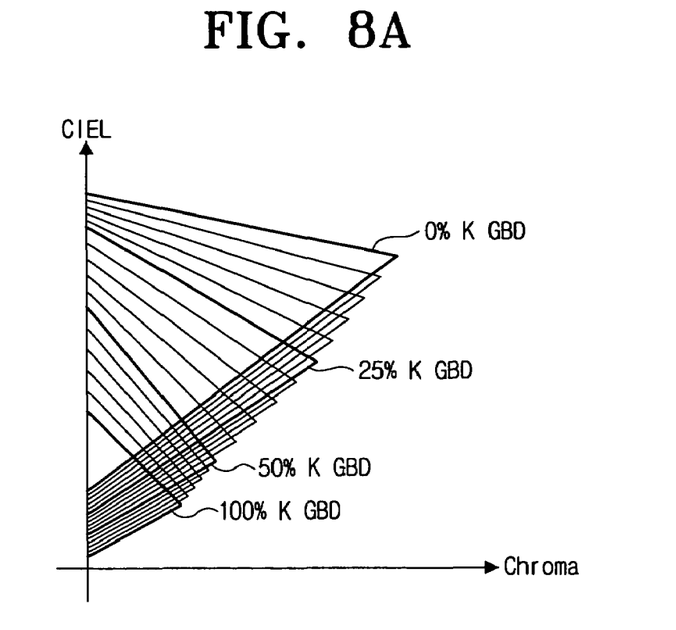
FIG. 8A is a diagram illustrating how to generate an additional number of K GBDs by interpolation using existing K GBDs.
Figure 8B:
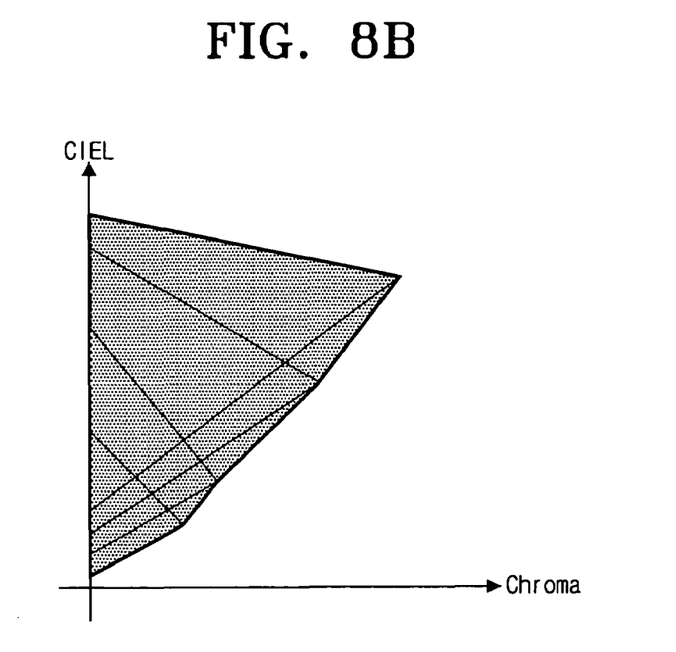
FIG. 8B is a diagram of a gamut defined by the total GBDs including the color gamuts built by an additional number of K GBDs.

FIG. 8A shows the generation of an additional number of K GBDs by means of the interpolation of the existing four K GBDs (0% K GBD, 25% K GBD, 50% K GBD, and 100% K GBD). The shaded portion in FIG. 8B represents the gamut defined by the total GBD that covers all gamuts of the K GBDs.

As set forth above, when converting the entered color data to the CMYK data, the calculated K ratio can be adjusted to the K ratio printable by use of the K GBDs. Accordingly, the printing apparatus can substantially print according to the calculated K ratio and thus the degradation of the printing quality can be avoided.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A color data conversion apparatus comprising:
   a converter which converts entered color data to converted color data, the converted color data residing within a gamut defined by a total gamut boundary descriptor (GBD) that covers all gamuts defined by a plurality of K GBDs, and outputs the converted color data;
   a K ratio calculator which calculates a calculated K ratio based on the converted color data, wherein the K ratio calculator obtains an initial K ratio which is a K ratio corresponding to a lightness of the entered color data, and acquires the calculated K ratio using the initial K ratio;

a K ratio adjuster which adjusts the calculated K ratio, based on the plurality of K GBDs, and outputs a final K ratio, wherein the K ratio adjuster determines if the entered color data resides within a GBD corresponding to a first K ratio and within a GBD corresponding to a second K ratio that is greater than the first K ratio, wherein the K ratio adjuster outputs the calculated K ratio as the final K ratio when the calculated K ratio is greater than the first K ratio and less than the second K ratio, wherein the K ratio adjuster outputs the first K ratio as the final K ratio when the calculated K ratio is less than the first K ratio, and wherein the K ratio adjuster outputs the second K ratio as the final K ratio when the calculated K ratio is greater than the second K ratio; and a CMY ratio calculator for calculating C, M, and Y ratios based on the final K ratio.

2. The color data conversion apparatus of claim 1, wherein the K ratio calculator acquires the calculated K ratio using the initial K ratio by using a graph produced by drawing a curve line corresponding to a certain rate of change from a point corresponding to a maximum K ratio to a point corresponding to a start lightness in a coordinate.

3. The color data conversion apparatus of claim 2, wherein the K ratio calculator calculates the K ratio by multiplying a generated output ratio and the initial K ratio using a function that has a chroma of the entered color data as an input variable.

4. The color data conversion apparatus of claim 3, wherein the function used by the K ratio calculator produces the generated output ratio which is less than a predetermined value when the input chroma resides outside a predetermined chroma range.

5. The color data conversion apparatus of claim 1, wherein the K ratio calculator calculates a first weight using a lightness of an input achromatic color and a start lightness, sets a maximum K ratio and a minimum K ratio to its upper limit K ratio and lower limit K ratio, respectively, and calculates the K ratio using the first weight, the upper limit K ratio and the lower limit K ratio, the input achromatic color has the same lightness as that of an input color corresponding to an input color data and the maximum K ratio and the minimum K ratio are determined among K ratios corresponding to the K GBDs that cover the input achromatic color.

6. The color data conversion apparatus of claim 5, wherein the K ratio calculator calculates the first weight (weight 1) and the K ratio by the following equations:

$$\text{Weight } 1 = 1 - \left( \frac{\text{Lightness of input achromatic color}}{\text{Start Lightness } L_{start}} \right); \text{ and}$$

$K$ ratio=(1−weight 1)(lower limit $K$ ratio)+(weight 1)(upper limit $K$ ratio).

7. The color data conversion apparatus of claim 5, wherein the K ratio calculator, if the lightness of the input achromatic color is greater than the start lightness, sets the K ratio to '0'.

8. The color data conversion apparatus of claim 1, wherein the K ratio adjuster calculates a second weight using a chroma of an input color corresponding to an input color data, sets a maximum K ratio and a minimum K ratio to its upper limit K ratio and lower limit K ratio, respectively, and calculates the final K ratio using the second weight, the upper limit K ratio and the lower limit K ratio, the maximum K ratio and the minimum K ratio are determined among K ratios corresponding to the K GBDs that cover the input color and correspond to the K ratio equal to or less than the K ratio calculated by the K ratio calculator.

9. The color data conversion apparatus of claim 8, wherein the K ratio adjustor calculates the second weight (weight 2) and the final K ratio by the following equations:

$$\text{weight } 2 = 1 - \sqrt{\frac{\text{chroma of input } color^3}{\text{chroma of input } color^3 + 500{,}000}}; \text{ and}$$

final $K$ ratio=(1−weight 2)(lower limit $K$ ratio)+(weight 2)(upper limit $K$ ratio).

10. The color data conversion apparatus of claim 8, wherein the K ratio adjuster, if the chroma of the input color corresponding to the input color data is '0', sets the K ratio calculated by the K ratio calculator, to the final K ratio.

11. A color data conversion method comprising:

converting entered color data to converted color data, the converted color data residing within a gamut defined by a total gamut boundary descriptor (GBD) that covers all gamuts defined by a plurality of K GBDs, and outputting the converted color data;

calculating a K ratio based on the converted color data, wherein the calculating of the K ratio obtains an initial K ratio which is a K ratio corresponding to a lightness of the entered color data, and acquires the calculated K ration using the initial K ratio;

adjusting the calculated K ratio based on the plurality of K gamut GBDs, and outputting a final K ratio, wherein the adjusting of the K ratio comprises determining if the entered color data resides within each of a GBD corresponding to a first K ratio and within a GBD corresponding to a second K ratio that is greater than the first K ratio, wherein the adjusting of the K ratio outputs the calculated K ratio as the final K ratio when the calculated K ratio is greater than the first K ratio and less than the second K ratio, wherein the adjusting of the K ratio outputs the first K ratio as the final K ratio when the calculated K ratio is less than the first K ratio, and wherein the adjusting of the K ratio outputs the second K ratio as the final K ratio when the calculated K ratio is greater than the second K ratio; and calculating C, M, and Y ratios based on the final K ratio.

12. The color data conversion method of claim 11, wherein the calculating of the K ratio acquires the calculated K ratio using the obtained initial K ratio using a graph produced by drawing a curve line corresponding to a certain rate of change from a point corresponding to a maximum K ratio to a point corresponding to a start lightness in a coordinate.

13. The color data conversion method of claim 12, wherein the K ratio is calculated by multiplying a generated output ratio and the initial K ratio using a function that has a chroma of the entered color data as an input variable.

14. The color data conversion method of claim 13, wherein the function used for the calculation of the K ratio produces the generated output ratio which is less than a predetermined value when the input chroma resides outside a predetermined chroma range.

15. The color data conversion method of claim 11, wherein the calculating of the K ratio comprises:
- calculating a first weight using a lightness of an input achromatic color and a start lightness, the input achromatic color having the same lightness as that of an input color corresponding to an input color data;
- setting a maximum K ratio and a minimum K ratio to its upper limit K ratio and lower limit K ratio, respectively, the maximum K ratio and the minimum K ratio determined among K ratios corresponding to the K GBDs that cover the input achromatic color; and
- calculating the K ratio using the first weight, the upper limit K ratio and the lower limit K ratio.

16. The color data conversion method of claim 15, wherein the calculating of the K ratio calculates the first weight (weight 1) and the K ratio by the following equations:

$$\text{Weight } 1 = 1 - \left( \frac{\text{Lightness of input achromatic color}}{\text{Start Lightness } L_{start}} \right); \text{ and}$$

$$K \text{ ratio} = (1 - \text{weight } 1)(\text{lower limit } K \text{ ratio}) + (\text{weight } 1)(\text{upper limit } K \text{ ratio}).$$

17. The color data conversion method of claim 15, wherein the calculating of the K ratio further comprises setting, if the lightness of the input achromatic color is greater than the start lightness, the K ratio to '0'.

18. The color data conversion method of claim 11, wherein the adjusting of the K ratio comprises:
- calculating a second weight using a chroma of an input color corresponding to an input color data;
- setting a maximum K ratio and a minimum K ratio to its upper limit K ratio and lower limit K ratio, respectively, the maximum K ratio and the minimum K ratio determined among K ratios corresponding to the K GBDs that cover the input color and correspond to the K ratio equal to or less than the K ratio calculated in the operation of the calculating of the K ratio; and
- calculating the final K ratio using the second weight, the upper limit K ratio and the lower limit K ratio.

19. The color data conversion method of claim 18, wherein the adjusting of the K ratio calculates the second weight (weight 2) and the final K ratio by the following equations:

$$\text{weight } 2 = 1 - \sqrt{\frac{\text{chroma of input color}^3}{\text{chroma of input color}^3 + 500,000}}; \text{ and}$$

$$\text{final } K \text{ ratio} = (1 - \text{weight } 2)(\text{lower limit } K \text{ ratio}) + (\text{weight } 2)(\text{upper limit } K \text{ ratio}).$$

20. The color data conversion method of claim 18, wherein the adjusting of the K ratio further comprises setting, if the chroma of the input color corresponding to the input color data is '0', the K ratio calculated by the K ratio calculator, to the final K ratio.

* * * * *